United States Patent
Park

(10) Patent No.: US 10,437,475 B2
(45) Date of Patent: Oct. 8, 2019

(54) DATA STORAGE DEVICE AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/632,568

(22) Filed: Jun. 26, 2017

(65) Prior Publication Data

US 2018/0217761 A1   Aug. 2, 2018

(30) Foreign Application Priority Data

Feb. 2, 2017   (KR) .................. 10-2017-0014933

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 13/16 | (2006.01) |

(52) U.S. Cl.
CPC ........... *G06F 3/0608* (2013.01); *G06F 3/061* (2013.01); *G06F 3/0632* (2013.01); *G06F 3/0638* (2013.01); *G06F 3/0655* (2013.01); *G06F 3/0659* (2013.01); *G06F 3/0668* (2013.01); *G06F 3/0673* (2013.01); *G06F 13/1668* (2013.01); *G06F 2206/1012* (2013.01)

(58) Field of Classification Search
CPC .. G06F 9/3855; G06F 13/1626; G06F 9/4881; G06F 9/5038
USPC ........................................................ 711/200
See application file for complete search history.

(56) References Cited

U.S. PATENT DOCUMENTS

| | | | |
|---|---|---|---|
| 2003/0217239 A1* | 11/2003 | Jeddeloh ............. | G06F 13/1626 711/158 |
| 2011/0296137 A1* | 12/2011 | Archer .............. | G06F 15/17318 712/16 |
| 2014/0075102 A1* | 3/2014 | Oh ....................... | G06F 12/0246 711/103 |
| 2017/0075572 A1* | 3/2017 | Utevsky ................ | G06F 3/0659 |

FOREIGN PATENT DOCUMENTS

KR   1020120134917   12/2012

* cited by examiner

*Primary Examiner* — Edward J Dudek, Jr.
*Assistant Examiner* — Sidney Li
(74) *Attorney, Agent, or Firm* — IP & T Group LLP

(57) ABSTRACT

A data storage device includes a storage medium including a plurality of logical units; and a controller suitable for accessing the storage medium by logical unit, the controller comprising: a first processor suitable for aligning tasks corresponding to at least one logical unit among the plurality of logical units, depending on a priority; and a second processor suitable for accessing other logical units among the plurality of logical units, wherein the first processor entrusts a task alignment operation for the other logical units, to the second processor, based on workloads of the first and second processors.

14 Claims, 4 Drawing Sheets

(H) : High priority
(M) : Middle priority
(L) : Low priority

DATA STORAGE DEVICE AND OPERATING METHOD THEREOF

CROSS-REFERENCES TO RELATED APPLICATION

The present application claims priority under 35 U.S.C. § 119(a) to Korean application number 10-2017-0014933, flied on Feb. 2, 2017, in the Korean Intellectual Property Office, which is Incorporated herein by reference in its entirety.

BACKGROUND

1. Technical Field

Various embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external device or may be fabricated separately and then connected afterwards to an external device.

SUMMARY

In an embodiment, a data storage device may include: a storage medium including a plurality of logical units; and a controller suitable for accessing the storage medium by logical unit, the controller comprising: a first processor suitable for aligning tasks corresponding to at least one logical unit among the plurality of logical units, depending on a priority; and a second processor suitable for accessing other logical units among the plurality of logical units, wherein the first processor entrusts a task alignment operation for the other logical units, to the second processor, based on workloads of the first and second processors.

In an embodiment, a method for operating a data storage device may include: analyzing a workload of a second processor; entrusting a task alignment operation for at least one first logical unit among a plurality of logical units of a storage medium, to the second processor, depending on a result of the analyzing; aligning tasks corresponding to a second logical unit not entrusted to the second processor among the plurality of logical units, depending on a priority; and queuing the second logical unit to an execution queue such that aligned tasks are executed by the second processor.

In an embodiment, a method for operating a data storage device may include: being entrusted with a task alignment operation for at least one logical unit among a plurality of logical units of a storage medium, depending on a workload; aligning tasks corresponding to the logical unit, depending on a priority; and accessing the logical unit by executing aligned tasks.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Figure 1:
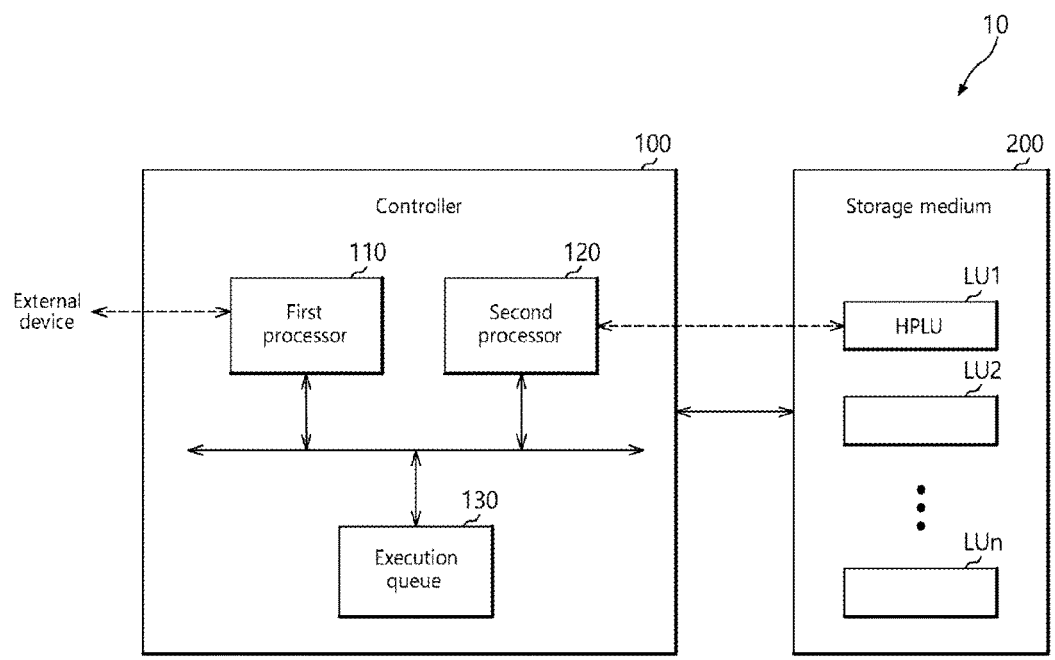
FIG. 1 is a block diagram illustrating a data storage device in accordance with an embodiment.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not Intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more Intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device 10 in accordance with an embodiment.

The data storage device 10 may be configured to store data provided from an external device, in response to a write request from the external device. Also, the data storage device 10 may be configured to provide stored data to the external device, in response to a read request from the external device.

The data storage device 10 may be configured by a Personal Computer Memory Card International Association (PCMCIA) card, a Compact Flash (CF) card, a smart media card, a memory stick, various multimedia cards (for example, MMC, eMMC, RS-MMC, and MMC-Micro), various secure digital cards (for example, SD, Mini-SD, and Micro-SD), a Universal Flash Storage (UFS), a Solid State Drive (SSD) and the like.

The data storage device 10 may include a controller 100 and a storage medium 200.

The controller 100 may store data in the storage medium 200 in response to a write request received from an external device. Also, the controller 100 may read data stored in the storage medium 200 and output the read data to the external device in response to a read request received from the external device.

The external device may configure the storage medium 200 into a plurality of logical units LU1 to LUn, and request the controller 100 to execute a task for a certain logical unit among the plurality of logical units LU1 to LUn. The controller 100 may access the certain logical unit by executing the task according to the request of the external device. The controller 100 may retain unexecuted tasks up to a predetermined number for each of the logical units LU1 to LUn. In this situation, the controller 100 may access the storage medium 200 by logical unit. In detail, if the controller 100 accesses a certain logical unit among the plurality of logical units LU1 to LUn, the controller 100 may execute all tasks for the certain logical unit, and then, execute tasks for another logical unit.

The controller 100 may include a first processor 110, a second processor 120, and an execution queue 130.

The first processor 110 may interface with the external device. For example, the first processor 110 may interface with the external device based on the universal flash storage (UFS) protocol. However, it is to be noted that the embodiment is not limited thereto. The first processor 110 may be allocated with a task for a certain logical unit among the plurality of logical units LU1 to LUn, from the external device.

As described above, tasks may be pending up to the predetermined number for each of the logical units LU1 to LUn. The predetermined number may be determined by an interface protocol with the external device. Before accessing the storage medium 200 by logical unit, the first processor 110 may align tasks pending for a logical unit to access, depending on a priority. That is, a task alignment operation may be performed by logical unit. The priority of a task may be determined by the external device, and the first processor 110 may receive together information on a priority when receiving a task from the external device.

By executing sequentially the tasks aligned by the first processor 110 depending on a priority, the second processor 120 may access the storage medium 200 by logical unit. The second processor 120 may not access the other logical units LU2 to LUn until all tasks for a logical unit which is being accessed, for example, the logical unit LU1, are executed.

Figure 2:
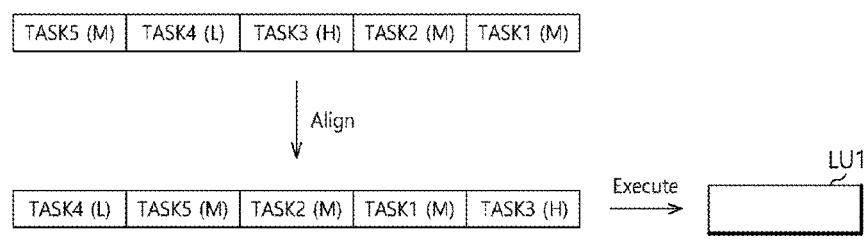
FIG. 2 is a diagram illustrating an example of a method in which tasks for a logical unit are processed.

FIG. 2 is a diagram illustrating an example of a method in which tasks for a logical unit (for example, the logical unit LU1 of FIG. 1) among a plurality of logical units are processed.

Referring to FIG. 2, for the logical unit LU1, five tasks TASK1 to TASK5 requested sequentially from the external device may be pending. Before accessing the logical unit LU1, the first processor 110 of FIG. 1 may align the tasks TASK1 to TASK5 according to priorities. Priorities may be divided into three kinds including high, middle and low priorities. For example, the tasks TASK1 to TASK5 may be aligned in the order of TASK3→TASK1→TASK2→TASK5→TASK4. Then, the second processor 120 may access the logical unit LU1 by sequentially executing the aligned tasks.

In this regard, as the number of tasks which may be pending for each of the logical units LU1 to LUn is large, a task alignment operation may increase the overhead of the first processor 110. Also, since the second processor 120 may access a logical unit only when the task alignment operation of the first processor 110 is completed, the second processor 120 may undergo starvation until the task alignment operation is completed.

Referring again to FIG. 1, according to the present embodiment, the first processor 110 may entrust a task alignment operation for at least one logical unit among the plurality of logical units, to the second processor 120, based on the workloads of the first and second processors 110 and 120. According to an embodiment, the first processor 110 may analyze the current and/or future workloads of the first and second processors 110 and 120 and determine the number of logical units for which task alignment operations are to be entrusted, with a predetermined cycle. According to an embodiment, as the workload of the second processor 120 is low, the first processor 110 may entrust task alignment operations for a larger number of logical units, to the second processor 120. According to an embodiment, if the workload of the second processor 120 is smaller than a predetermined reference, the first processor 110 may entrust task alignment operations for a preset number of logical units, to the second processor 120. According to an embodiment, if it is determined that the workload of the second processor 120 is high, the first processor 110 may entrust no task alignment operation to the second processor 120.

Accordingly, in order to access a logical unit for which a task alignment operation is entrusted, the second processor 120 may align tasks for the corresponding logical unit depending on a priority, and execute the aligned tasks. Since the second processor 120 shares task alignment operations with the first processor 110 without waiting until the task alignment operation of the first processor 110 is completed, the starvation of the second processor 120 may be prevented, and the task processing speed of the data storage device may be improved.

According to an embodiment, the first processor 110 may take full charge of a task alignment operation for a highest priority logical unit HPLU, for example, the logical unit LU1, among the logical units LU1 to LUn. At least one highest priority logical unit HPLU may be determined by an interface protocol with the external device.

The highest priority logical unit HPLU may be processed specially, unlike the other logical units LU2 to LUn, that are normal logical units LU2 to LUn. The highest priority logical unit HPLU may be accessed prior to the normal logical units LU2 to LUn. Therefore, the first processor 110 may perform a task alignment operation for the highest priority logical unit HPLU, prior to the normal logical units LU2 to LUn. If the task alignment operation of the first processor 110 for the highest priority logical unit HPLU is completed, the second processor 120 may access the highest priority logical unit HPLU prior to the normal logical units LU2 to LUn. If a normal logical unit is being accessed when the task alignment operation of the first processor 110 for the highest priority logical unit HPLU is completed, the second processor 120 may access the highest priority logical unit HPLU after executing all tasks for the normal logical unit which is being accessed.

Furthermore, at least one normal logical unit for which a task alignment operation is entrusted to the second processor 120 may be selected optionally among the normal logical units LU2 to LUn except the highest priority logical unit HPLU.

Figure 3:
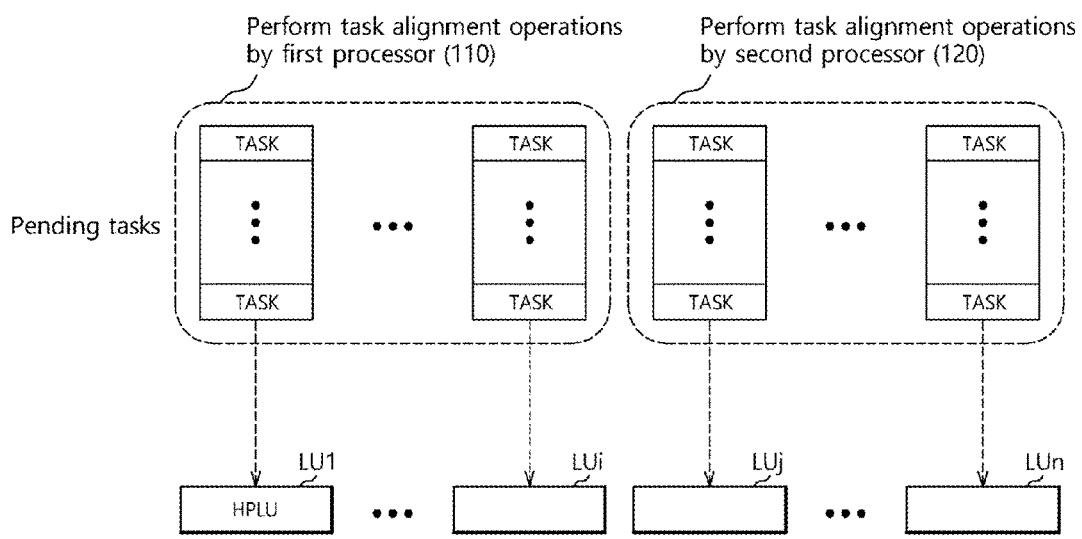
FIG. 3 is a diagram Illustrating an example of task alignment operations shared between first and second processors.

FIG. 3 is a diagram Illustrating an example in which task alignment operations are shared between the first and second processors 110 and 120 of FIG. 1. FIG. 3 illustrates pending tasks for the respective logical units LU1 to LUn.

Referring to FIG. 3, the first processor 110 may entrust task alignment operations for logical units LUj to LUn, to the second processor 120, through a workload analysis. The first processor 110 may perform directly task alignment operations for logical units LU1 to LUi for which task alignment operations are not entrusted to the second processor 120. The number of the logical units LUj to LUn for which task alignment operations are entrusted to the second processor 120 may be changed depending on workloads. The logical units LUj to LUn for which task alignment operations are entrusted to the second processor 120 may be selected optionally among the logical units LU2 to LUn except the highest priority logical unit HPLU. The first processor 110 may take full charge of the task alignment operation for the highest priority logical unit HPLU.

Referring again to FIG. 1, the execution queue 130 may be provided to prevent an interference that is likely to occur as task alignment operations are shared between the first and second processors 110 and 120. The second processor 120 may recognize logical units for which task alignment operations are completed, by referring to the execution queue 130. Each of the first and second processors 110 and 120 may queue a logical unit for which a task alignment operation is completed, to the execution queue 130. The second processor 120 may select a logical unit for which a task alignment operation is completed, according to a sequence queued to the execution queue 130, and execute tasks for the selected logical unit.

The storage medium 200 may include at least one non-volatile memory device (not shown). The nonvolatile memory device may include a flash memory (for example, a NAND flash or a NOR flash), a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

The storage medium 200 may be configured into the logical units LU1 to LUn by the external device. The logical units LU1 to LUn may correspond to, for example, different partitions. The storage medium 200 may be accessed by logical unit by the controller 100.

Figure 4:
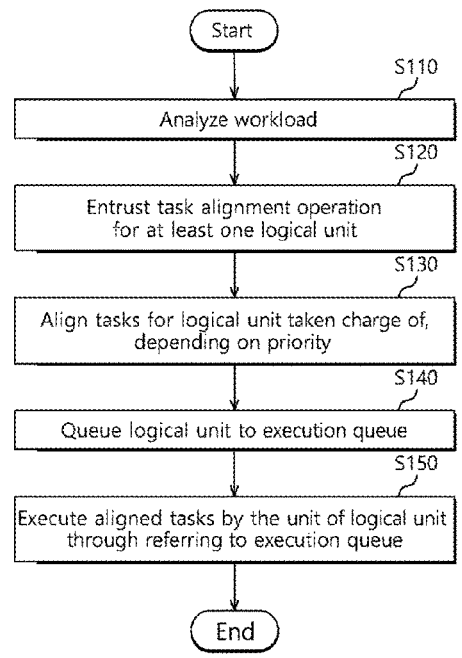
FIG. 4 is a flow chart illustrating an example of a method for operating the data storage device of FIG. 1.

FIG. 4 is a flow chart illustrating an example of a method for operating the data storage device 10 of FIG. 1.

Referring to FIG. 4, at step S110, the first processor 110 may analyze the workloads of the first and second processors 110 and 120. The first processor 110 may determine that the workload of the second processor 120 is relatively affordable.

At step S120, the first processor 110 may entrust a task alignment operation for at least one logical unit among the logical units LU1 to LUn, to the second processor 120.

At step S130, each of the first and second processors 110 and 120 may align tasks for a logical unit which it takes charge of, depending on a priority.

At step S140, each of the first and second processors 110 and 120 may queue a logical unit for which a task alignment operation is completed, to the execution queue 130.

At step S150, the second processor 120 may execute aligned tasks by logical unit to access a logical unit for which a task alignment operation is completed, by referring to the execution queue 130.

Figure 5:
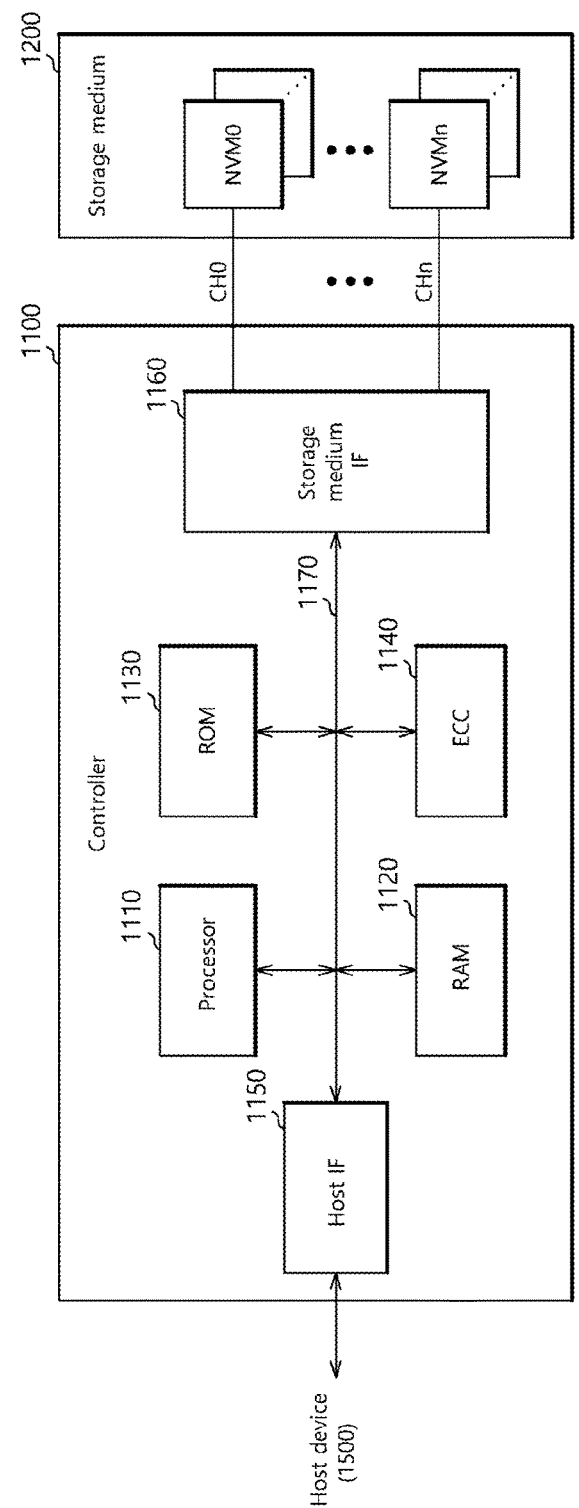
FIG. 5 is a block diagram Illustrating a solid state drive (SSD) in accordance with an embodiment.

FIG. 5 is a block diagram illustrating a solid state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface (IF) 1150 and a storage medium interface (IF) 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control Internal operations of the SSD 1000 such as a merge operation, a wear leveling operation, and so forth.

The processor 1110 may be configured substantially the same as the second processor 120 of FIG. 1. The processor 1110 may access the storage medium 1200 by logical unit. The processor 1110 may execute tasks aligned by the host interface 1150, and access a logical unit corresponding to the aligned tasks.

Also, the processor 1110 may be entrusted with a task alignment operation for at least one logical unit of the storage medium 1200, from the host interface 1150. The processor 1110 may align tasks corresponding to an entrusted logical unit, depending on priority, and execute the aligned tasks.

The RAM 1120 may store programs and program data to be used by the processor 1110. The RAM 1120 may temporarily store data received from the host interface 1150 before transferring it to the storage medium 1200, and may temporarily store data received from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error which occurred in data, according to an ECC algorithm.

The host interface 1150 may exchange data processing requests, data, etc. with the host device 1500.

The host interface 1150 may be configured substantially the same as the first processor 110 of FIG. 1. The host interface 1150 may entrust a task alignment operation for at least one logical unit of the storage medium 1200, to the processor 1110, depending on the workload of the processor 1110. The host interface 1150 may perform a task alignment operation for a logical unit which is not entrusted to the processor 1110.

The storage medium interface 1160 may transmit control signals and data to the storage medium 1200. The storage medium interface 1160 may receive data from the storage medium 1200. The storage medium interface 1160 may be coupled with the storage medium 1200 through a plurality of channels CH0 to CHn.

The storage medium 1200 may include the plurality of nonvolatile memory devices NVM0 to NVMn. Each of the plurality of nonvolatile memory devices NVM0 to NVMn may perform a write operation and/or a read operation according to control of the controller 1100.

Figure 6:
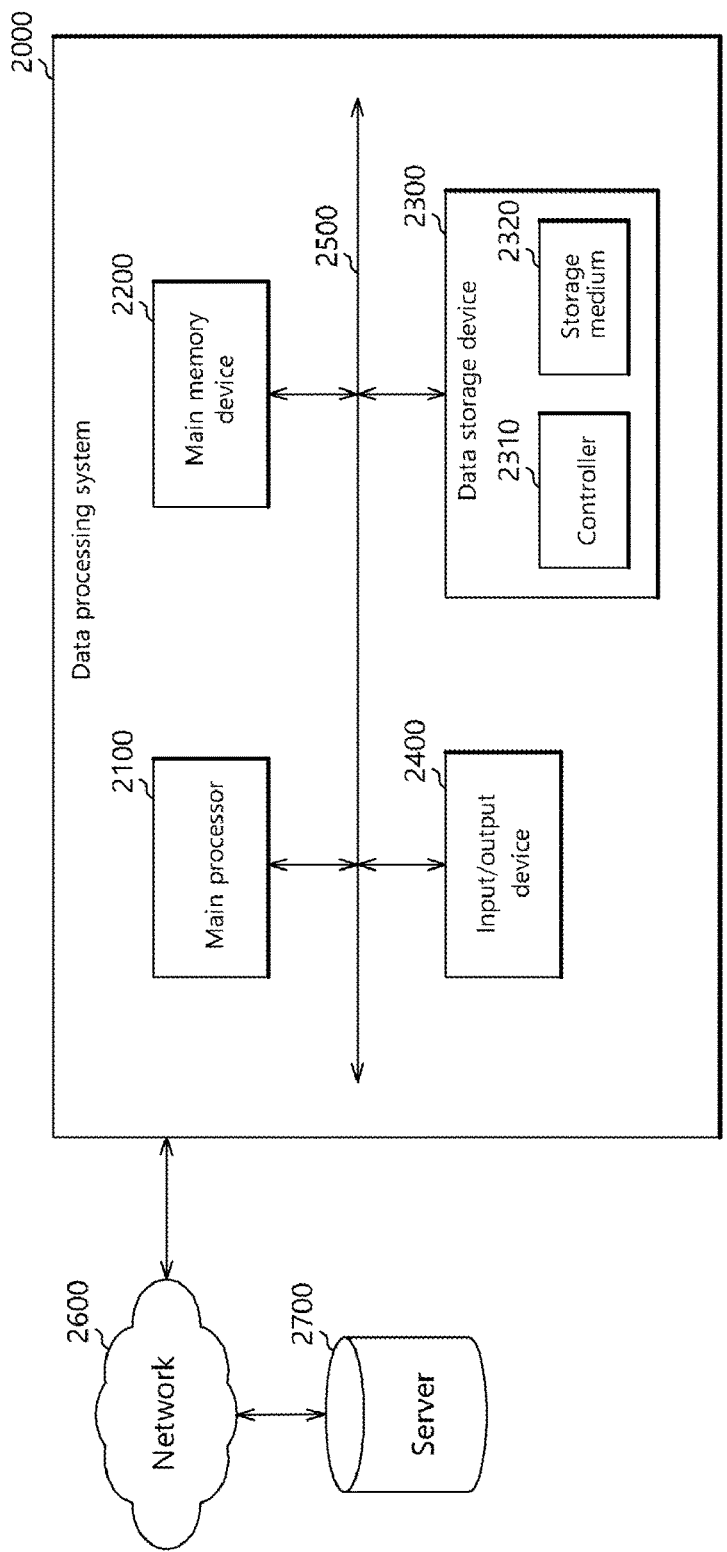
FIG. 6 is a block diagram illustrating a data processing system to which the data storage device in accordance with the embodiment is applied.

FIG. 6 is a block diagram illustrating a data processing system 2000 to which the data storage device 10 in accordance with the embodiment is applied.

The data processing system 2000 may include a computer, a laptop, a netbook, a smart phone, a digital television (TV), a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, a microprocessor. The main processor 2100 may execute software such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited based on the described embodiments. It will be apparent to those skilled in the art to which the present invention pertains that various other changes and modifications may be made without departing from the spirit and scope of the invention as defined in the following claims.

What is claimed is:

1. A data storage device comprising:
a storage medium including a plurality of logical units; and
a controller configured to access the storage medium by logical unit,
the controller comprising:
a first processor configured to perform a task alignment operation for each logical unit by aligning tasks corresponding to the each logical unit, depending on a priority; and
a second processor configured to perform the task alignment operation for at least one logical unit, depending on workloads of the first and second processors,
wherein the first processor entrusts the task alignment operation for the at least one logical unit, to the second processor, when the first processor determines that the workload of the second processor is less than a predetermined reference, and
wherein the second processor shares the task alignment operation with the first processor without waiting until the task alignment operation of the first processor is complete.

2. The data storage device according to claim 1, wherein the second processor aligns tasks corresponding to the at least one logical unit, depending on the priority, and executes the aligned tasks.

3. The data storage device according to claim 1, wherein the first processor receives the tasks from an external device, by interfacing with the external device.

4. The data storage device according to claim 3, wherein the first processor interfaces with the external device, based on a universal flash storage (UFS) protocol.

5. The data storage device according to claim 1,
wherein the first processor performs the task alignment operation for a logical unit having a highest priority among the plurality of logical units, and
wherein, when the task alignment operation for the logical unit having a highest priority is completed, the second processor accesses the logical unit having a highest priority prior to other logical units.

6. The data storage device according to claim 1,
wherein the controller further comprises an execution queue,
wherein each of the first and second processors queues a logical unit for which the task alignment operation is completed, to the execution queue, and wherein the second processor selects a logical unit from the execution queue according to a queued sequence, and executes aligned tasks corresponding to a selected logical unit from the execution queue.

7. The data storage device according to claim 6, wherein the second processor does not execute tasks corresponding to other logical units subsequent to the selected logical unit in the execution queue, until all of the aligned tasks are executed.

8. A method for operating a data storage device, comprising:
analyzing, by a first processor, workloads of the first processor and a second processor;
entrusting, by the first processor, a task alignment operation for at least one first logical unit among a plurality of logical units of a storage medium, to the second processor, depending on a result of the analyzing;
aligning, by the first processor, tasks corresponding to a second logical unit not entrusted to the second processor among the plurality of logical units, depending on a priority; and
queuing the second logical unit to an execution queue such that aligned tasks, by the first processor, are executed by the second processor,
wherein the analyzing by the first processor includes determining that the workload of the second processor is less than a predetermined reference, and
wherein the second processor shares the task alignment operation with the first processor without waiting until the task alignment operation of the first processor is complete.

9. The method according to claim 8, further comprising:
receiving, by the first processor, a task from an external device, by interfacing with the external device.

10. The method according to claim 8, further comprising:
performing, by the first processor, a task alignment operation for a highest priority logical unit among the plurality of logical units.

11. A method for operating a data storage device, comprising:
performing a task alignment operation by a first processor for each logical unit among a plurality of logical units of a storage medium;
entrusting a second processor with the task alignment operation for at least one logical unit depending on workloads of the first processor and the second processor; and
aligning, by the second processor, tasks corresponding to the logical unit, depending on a priority,
wherein the entrusting includes the first processor determining that the workload of the second processor is less than a predetermined reference, and
wherein the second processor shares the task alignment operation with the first processor without waiting until the task alignment operation of the first processor is complete.

12. The method according to claim 11, further comprising:
queuing, by the second processor, the logical unit for which the task alignment operation is completed, to an execution queue;
selecting, by the second processor, a logical unit from the execution queue, according to a queued sequence; and
executing, by the second processor, aligned tasks corresponding to a selected logical unit.

13. The method according to claim 11, further comprising:
accessing, by the second processor, the each logical unit for which the task alignment operation is completed by the first processor.

14. The method according to claim 11, wherein tasks corresponding to other logical units among the plurality of logical units are prohibited from being executed, until all of the aligned tasks are executed.

* * * * *